US012635593B2

(12) United States Patent
Allgaier et al.

(10) Patent No.: US 12,635,593 B2
(45) Date of Patent: May 26, 2026

(54) DATA TRANSFER

(71) Applicant: Precision Planting LLC, Tremont, IL (US)

(72) Inventors: Ryan Allgaier, East Peoria, IL (US); David Aaron Wilcoxson, Tremont, IL (US); Norman Dubert, Morton, IL (US)

(73) Assignee: Precision Planting LLC, Tremont, IL (US)

( * ) Notice: Subject to any disclaimer, the term of this patent is extended or adjusted under 35 U.S.C. 154(b) by 161 days.

(21) Appl. No.: 18/260,644

(22) PCT Filed: Feb. 14, 2022

(86) PCT No.: PCT/IB2022/051290
§ 371 (c)(1),
(2) Date: Jul. 7, 2023

(87) PCT Pub. No.: WO2022/175801
PCT Pub. Date: Aug. 25, 2022

(65) Prior Publication Data
US 2024/0057508 A1     Feb. 22, 2024

Related U.S. Application Data

(60) Provisional application No. 63/154,231, filed on Feb. 26, 2021, provisional application No. 63/150,445, filed on Feb. 17, 2021.

(51) Int. Cl.
*A01B 79/00*     (2006.01)
*A01C 7/10*      (2006.01)
*G06V 20/10*     (2022.01)

(52) U.S. Cl.
CPC ............ *A01B 79/005* (2013.01); *A01C 7/105* (2013.01); *G06V 20/188* (2022.01)

(58) Field of Classification Search
CPC ..... A01B 79/005; G06V 20/188; A01C 7/105
(Continued)

(56) References Cited

U.S. PATENT DOCUMENTS 5,870,689 A * 2/1999 Hale .................... A01B 79/005
                                                    702/5
5,878,371 A * 3/1999 Hale .................... A01C 7/105
                                                    702/5
(Continued)

FOREIGN PATENT DOCUMENTS

WO     2008086318 A1   7/2008
WO     2012015957 A1   2/2012
(Continued)

OTHER PUBLICATIONS

UK Intellectual Property Office, Search Report for related UK Application No. GB2102906.1, dated 23 AGO 2021, 3 pages.
(Continued)

*Primary Examiner* — Manglesh M Patel

(57) ABSTRACT

A method of transferring as applied data from one agricultural monitor to another agricultural monitor without using external software to convert the data. The method includes collecting as applied data as a first machine that is coupled with a first agricultural implement both traverse a field and perform an agricultural operation on a first region of the field. The method further includes storing the as applied data into a file of a first device of the first machine and embedding prescription data and field boundary data into the file of the first device.

16 Claims, 6 Drawing Sheets

A SOFTWARE APPLICATION (E.G., AGRICULTURAL SOFTWARE APPLICATION) IS INITIATED ON A FIRST DEVICE (E.G., SYSTEM 2720, SYSTEM 220, COMPUTING SYTEM 340, 370, MONITOR DEVICE, ETC) AND DISPLAYED AS A USER INTERFACE. IN ONE EXAMPLE, THE SOFTWARE APPLICATION IS INITIATED ON THE FIRST DEVICE OF A FIRST MACHINE AS A FIRST AG IMPLEMENT TRAVERSES A FIELD. — 502

OBTAIN TELEMATICS, AS APPLIED DATA, AND IMAGES OF CROPS, PLANTS, AND FIELD CONDITIONS AS THE FIRST AG IMPLEMENT TRAVERSES A FIELD AND PERFORMS AN AGRICULTURAL OPERATION OR APPLICATION (E.G., PLANTING, FLUID APPLICATION, ETC.) ON A REGION OF THE FIELD. — 504

STORE THE TELEMATICS AND CAPTURED IMAGES INTO ONE OR MORE UNIFIED FILES. OPTIONALLY, THE AS APPLIED DATA CAN ALSO BE INCLUDED IN THE ONE OR MORE UNIFIED FILES. THE ONE OR MORE UNIFIED FILES MAY BE STORED LOCALLY IN THE FIRST DEVICE OF THE FIRST MACHINE — 506

TRANSFER THE ONE OR MORE UNIFIED FILES WITH THE TELEMATICS AND IMAGES TO A SECOND DEVICE OF A SECOND MACHINE. THE FIRST MACHINE AND THE SECOND MACHINE CAN BE COMMUNICATIVELY COUPLED TO EACH OTHER VIA A NETWORK (E.G., NETWORK 180, 280, 380, A LOCAL MACHINE-TO-MACHINE NETWORK, ETC.). — 508

(58) Field of Classification Search
USPC ........................................................ 701/50
See application file for complete search history.

(56) References Cited

U.S. PATENT DOCUMENTS

| | | | | |
|---|---|---|---|---|
| 5,902,343 | A * | 5/1999 | Hale .................... | A01B 79/005 |
| | | | | 342/357.62 |
| 5,978,723 | A * | 11/1999 | Hale .................... | A01B 79/005 |
| | | | | 701/50 |
| 6,041,582 | A * | 3/2000 | Tiede .................. | A01B 79/005 |
| | | | | 56/10.2 A |
| 6,216,071 | B1 * | 4/2001 | Motz ...................... | A01D 91/00 |
| | | | | 340/988 |
| 9,717,178 | B1 * | 8/2017 | Sauder ................... | A01D 91/04 |
| 10,255,670 | B1 * | 4/2019 | Wu ........................ | H04N 7/183 |
| 10,860,189 | B2 | 12/2020 | Allgaier et al. | |
| 11,185,007 | B1 * | 11/2021 | Berg ..................... | G06F 18/217 |
| 11,635,765 | B2 * | 4/2023 | Vandike ................ | B60K 35/22 |
| | | | | 701/50 |
| 11,944,026 | B1 * | 4/2024 | Lund ................... | A01B 63/002 |
| 2002/0099472 | A1 * | 7/2002 | Benneweis .......... | A01C 23/047 |
| | | | | 700/242 |
| 2002/0107609 | A1 * | 8/2002 | Benneweis .......... | A01B 79/005 |
| | | | | 700/231 |
| 2007/0233374 | A1 * | 10/2007 | Diekhans ............. | G05D 1/0219 |
| | | | | 701/50 |
| 2008/0140431 | A1 * | 6/2008 | Anderson ............ | A01B 79/005 |
| | | | | 701/50 |
| 2014/0002489 | A1 * | 1/2014 | Sauder ................... | G06T 11/00 |
| | | | | 345/629 |
| 2014/0358381 | A1 * | 12/2014 | Holland ............... | A01C 21/007 |
| | | | | 701/50 |
| 2015/0302305 | A1 * | 10/2015 | Rupp ...................... | G06N 7/06 |
| | | | | 706/46 |
| 2016/0071410 | A1 * | 3/2016 | Rupp ...................... | G08G 1/00 |
| | | | | 701/50 |
| 2016/0095274 | A1 * | 4/2016 | Wendte ............... | A01B 79/005 |
| | | | | 111/200 |
| 2016/0120097 | A1 * | 5/2016 | Chahley ................ | A01C 7/102 |
| | | | | 701/50 |
| 2016/0183447 | A1 * | 6/2016 | Buhler ................... | G06Q 50/02 |
| | | | | 701/50 |
| 2017/0185086 | A1 | 6/2017 | Sauder et al. | |
| 2018/0027145 | A1 * | 1/2018 | Kurzhanskiy ............ | G06T 7/12 |
| | | | | 382/283 |
| 2018/0314949 | A1 * | 11/2018 | Bender .................. | G06Q 50/02 |
| 2019/0150357 | A1 * | 5/2019 | Wu ........................ | H04N 7/188 |
| 2019/0212902 | A1 * | 7/2019 | Allgaier ............. | G06F 3/04845 |
| 2020/0019159 | A1 | 1/2020 | Kocer et al. | |
| 2020/0113113 | A1 * | 4/2020 | Shearer ................ | A01B 49/027 |
| 2020/0113169 | A1 * | 4/2020 | Jelenkovic .......... | A01M 7/0089 |
| 2020/0267889 | A1 | 8/2020 | Wintemute et al. | |
| 2021/0267117 | A1 * | 9/2021 | Bogdan ................ | A01B 79/005 |
| 2021/0337723 | A1 * | 11/2021 | McMahan .......... | G06F 16/1744 |
| 2022/0361392 | A1 * | 11/2022 | Wu ....................... | A01B 69/008 |
| 2023/0081037 | A1 * | 3/2023 | Kertai .................. | G05D 1/0291 |
| | | | | 701/50 |
| 2023/0196761 | A1 * | 6/2023 | Swanson ............ | G01C 21/3826 |
| 2024/0040965 | A1 * | 2/2024 | Anderson .......... | A01F 15/0825 |
| 2024/0057507 | A1 * | 2/2024 | Miller ................. | A01B 63/008 |
| 2024/0155963 | A1 * | 5/2024 | Travis ..................... | B60Q 1/52 |
| 2024/0155970 | A1 * | 5/2024 | Plattner ................. | A01B 79/02 |
| 2025/0307957 | A1 * | 10/2025 | Dumstorff ............. | G06Q 10/04 |

FOREIGN PATENT DOCUMENTS

| | | | |
|---|---|---|---|
| WO | 2012129442 | A2 | 9/2012 |
| WO | 2013049198 | A1 | 4/2013 |
| WO | 2014018717 | A1 | 1/2014 |
| WO | 2014026183 | A2 | 2/2014 |

OTHER PUBLICATIONS

European Patent Office, Search Report for related PCT Application No. PCT/IB2022/051290, dated Apr. 29, 2022, 13 pages.

* cited by examiner

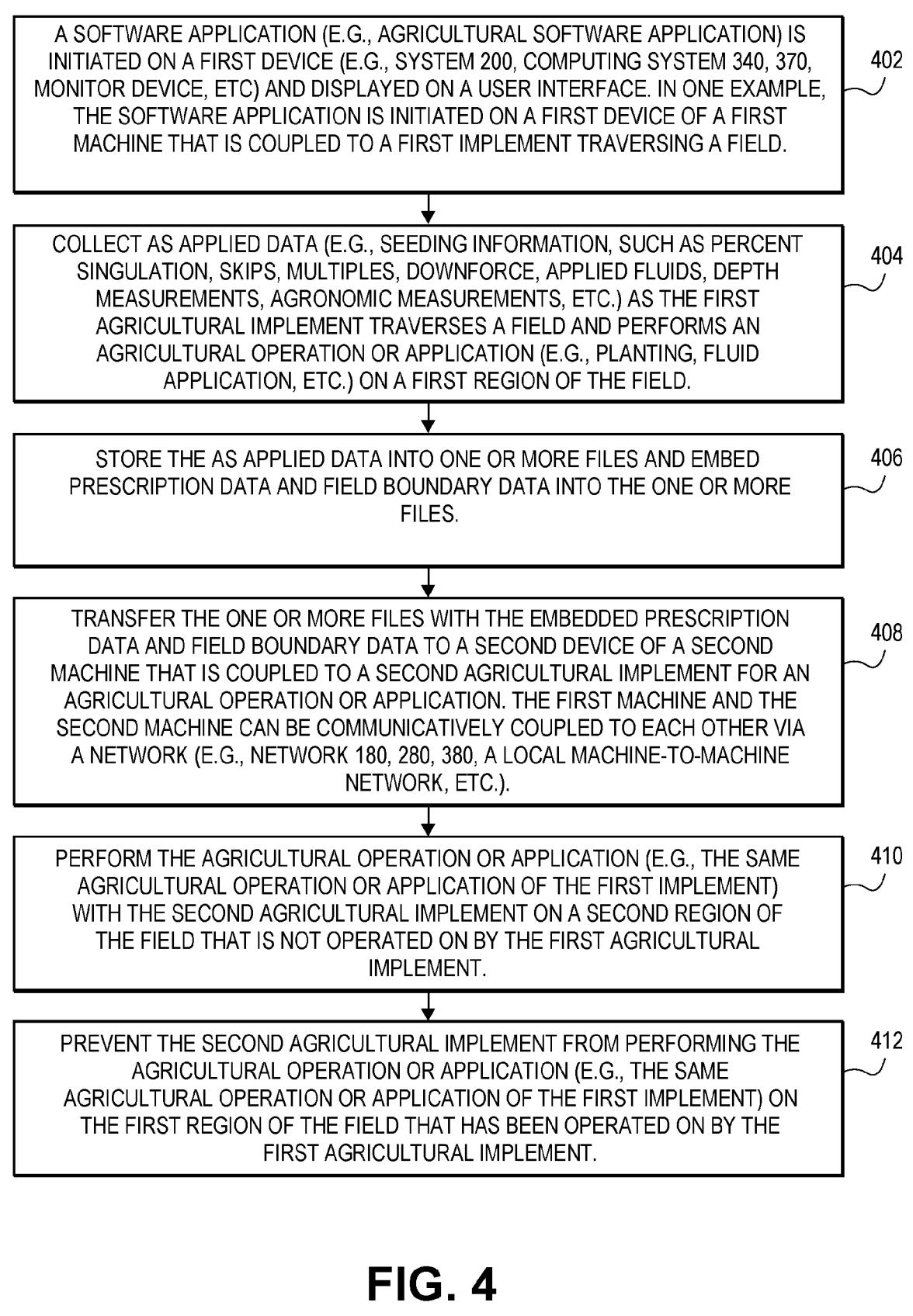

A SOFTWARE APPLICATION (E.G., AGRICULTURAL SOFTWARE APPLICATION) IS INITIATED ON A FIRST DEVICE (E.G., SYSTEM 200, COMPUTING SYSTEM 340, 370, MONITOR DEVICE, ETC) AND DISPLAYED ON A USER INTERFACE. IN ONE EXAMPLE, THE SOFTWARE APPLICATION IS INITIATED ON A FIRST DEVICE OF A FIRST MACHINE THAT IS COUPLED TO A FIRST IMPLEMENT TRAVERSING A FIELD. — 402

COLLECT AS APPLIED DATA (E.G., SEEDING INFORMATION, SUCH AS PERCENT SINGULATION, SKIPS, MULTIPLES, DOWNFORCE, APPLIED FLUIDS, DEPTH MEASUREMENTS, AGRONOMIC MEASUREMENTS, ETC.) AS THE FIRST AGRICULTURAL IMPLEMENT TRAVERSES A FIELD AND PERFORMS AN AGRICULTURAL OPERATION OR APPLICATION (E.G., PLANTING, FLUID APPLICATION, ETC.) ON A FIRST REGION OF THE FIELD. — 404

STORE THE AS APPLIED DATA INTO ONE OR MORE FILES AND EMBED PRESCRIPTION DATA AND FIELD BOUNDARY DATA INTO THE ONE OR MORE FILES. — 406

TRANSFER THE ONE OR MORE FILES WITH THE EMBEDDED PRESCRIPTION DATA AND FIELD BOUNDARY DATA TO A SECOND DEVICE OF A SECOND MACHINE THAT IS COUPLED TO A SECOND AGRICULTURAL IMPLEMENT FOR AN AGRICULTURAL OPERATION OR APPLICATION. THE FIRST MACHINE AND THE SECOND MACHINE CAN BE COMMUNICATIVELY COUPLED TO EACH OTHER VIA A NETWORK (E.G., NETWORK 180, 280, 380, A LOCAL MACHINE-TO-MACHINE NETWORK, ETC.). — 408

PERFORM THE AGRICULTURAL OPERATION OR APPLICATION (E.G., THE SAME AGRICULTURAL OPERATION OR APPLICATION OF THE FIRST IMPLEMENT) WITH THE SECOND AGRICULTURAL IMPLEMENT ON A SECOND REGION OF THE FIELD THAT IS NOT OPERATED ON BY THE FIRST AGRICULTURAL IMPLEMENT. — 410

PREVENT THE SECOND AGRICULTURAL IMPLEMENT FROM PERFORMING THE AGRICULTURAL OPERATION OR APPLICATION (E.G., THE SAME AGRICULTURAL OPERATION OR APPLICATION OF THE FIRST IMPLEMENT) ON THE FIRST REGION OF THE FIELD THAT HAS BEEN OPERATED ON BY THE FIRST AGRICULTURAL IMPLEMENT. — 412

FIG. 4

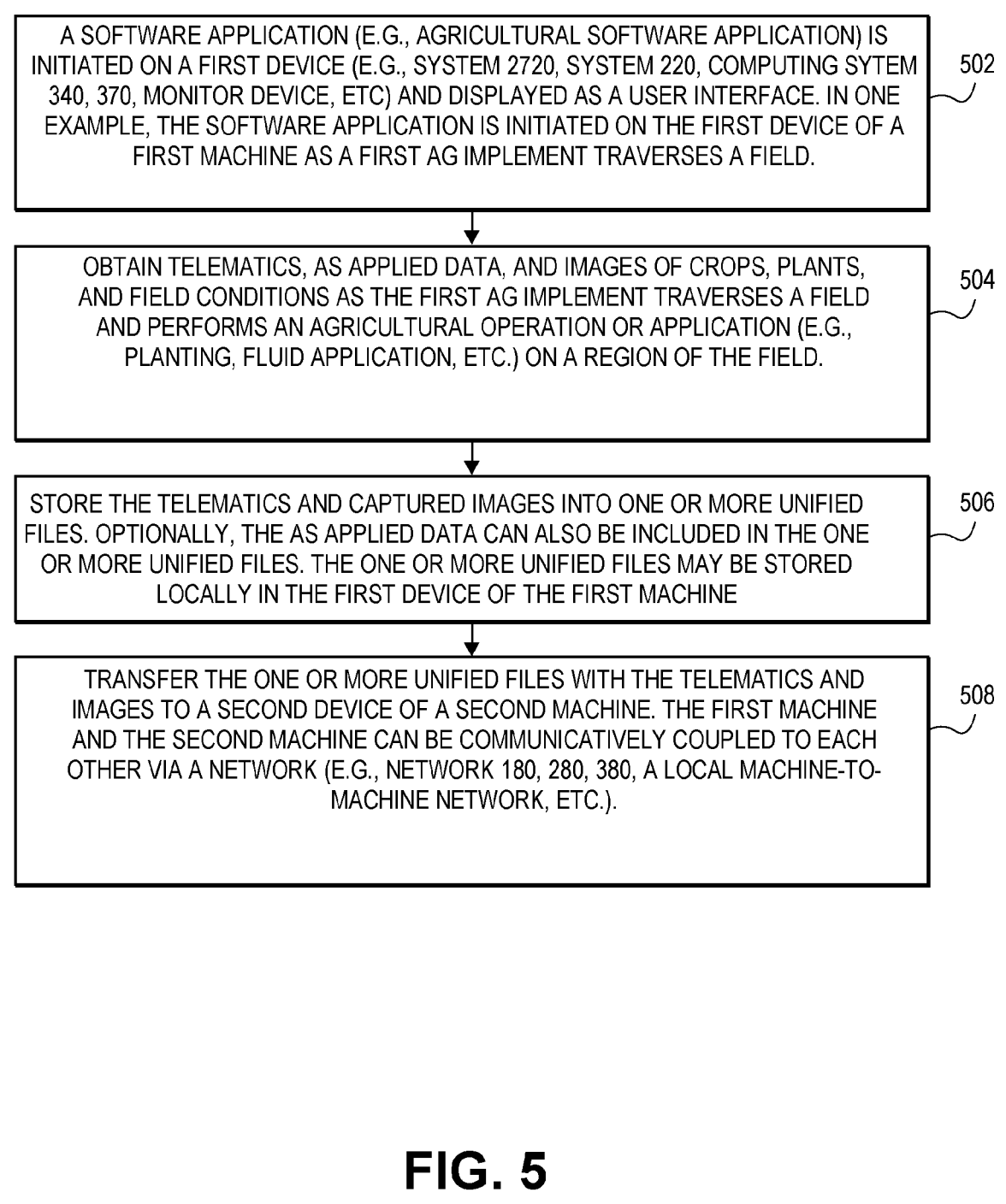

A SOFTWARE APPLICATION (E.G., AGRICULTURAL SOFTWARE APPLICATION) IS INITIATED ON A FIRST DEVICE (E.G., SYSTEM 2720, SYSTEM 220, COMPUTING SYTEM 340, 370, MONITOR DEVICE, ETC) AND DISPLAYED AS A USER INTERFACE. IN ONE EXAMPLE, THE SOFTWARE APPLICATION IS INITIATED ON THE FIRST DEVICE OF A FIRST MACHINE AS A FIRST AG IMPLEMENT TRAVERSES A FIELD.  502

OBTAIN TELEMATICS, AS APPLIED DATA, AND IMAGES OF CROPS, PLANTS, AND FIELD CONDITIONS AS THE FIRST AG IMPLEMENT TRAVERSES A FIELD AND PERFORMS AN AGRICULTURAL OPERATION OR APPLICATION (E.G., PLANTING, FLUID APPLICATION, ETC.) ON A REGION OF THE FIELD.  504

STORE THE TELEMATICS AND CAPTURED IMAGES INTO ONE OR MORE UNIFIED FILES. OPTIONALLY, THE AS APPLIED DATA CAN ALSO BE INCLUDED IN THE ONE OR MORE UNIFIED FILES. THE ONE OR MORE UNIFIED FILES MAY BE STORED LOCALLY IN THE FIRST DEVICE OF THE FIRST MACHINE  506

TRANSFER THE ONE OR MORE UNIFIED FILES WITH THE TELEMATICS AND IMAGES TO A SECOND DEVICE OF A SECOND MACHINE. THE FIRST MACHINE AND THE SECOND MACHINE CAN BE COMMUNICATIVELY COUPLED TO EACH OTHER VIA A NETWORK (E.G., NETWORK 180, 280, 380, A LOCAL MACHINE-TO-MACHINE NETWORK, ETC.).  508

FIG. 5

DATA TRANSFER

CROSS-REFERENCE TO RELATED APPLICATIONS

This application is a national phase entry under 35 U.S.C. § 371 of International Patent Application PCT/IB2022/051290, filed Feb. 14, 2022, designating the United States of America and published in English as International Patent Publication WO 2022/175801 A1 on Aug. 25, 2022, which claims the benefit of U.S. Provisional Application No. 63/150,445, filed on 17 Feb. 2021, and 63/154,231, filed on 26 Feb. 2021 entitled: DATA TRANSFER, the entire contents of each are hereby incorporated by reference.

FIELD

Embodiments of the present disclosure relate generally to a method and systems for data transfer of one or more files having as applied data that is embedded with prescription data.

BACKGROUND

When performing operations in an agricultural field, there may be times when multiple agricultural implements could be used to perform operations in a field. To coordinate the operation of implements so that one implement does not perform the same operations on a field where another implement already performed operations, as applied data collected by a monitor in a first agricultural implement needs to be transferred to a monitor on a second agricultural implement. To transfer as applied data collected by a first monitor, the data needs to be extracted to external third party software at a remote location from the first monitor to convert the as applied data into prescriptions and boundaries, which converts the data from an original file into a separate file. The separate file is then imported as a prescription file from the remote location into the second monitor.

BRIEF SUMMARY

In an aspect of the disclosure there is provided a computer implemented method of transferring one or more files having as applied data and embedded prescription data from one agricultural monitor device of a first machine to another agricultural monitor device of a second machine without using external software to convert the data. The computer implemented method includes collecting as applied data as a first machine that is coupled with a first agricultural implement both traverse a field and perform an agricultural operation on a first region of the field. The computer implemented method further includes storing the as applied data into a file of a first device (first monitor) of the first machine and embedding prescription data and field boundary data into the file of the first device.

In one example, the computer implemented method further comprises transferring the file having the applied data, prescription data, and field boundary data to a second device of a second machine that is coupled with a second agricultural implement.

In another example of the computer-implemented method, the prescription and boundary data is embedded directly into the file having as applied data with no external software tools.

In another example of the computer-implemented method, the file from the first device provides prescriptions, boundaries, and coverage data directly to the second device of the second machine and thus influences control and operation of the agricultural operation that is being performed with the second machine and the second implement.

In another example of the computer-implemented method, the second device to display as-applied data of the second agricultural implement in-cab of the second machine alongside the as-applied data of the first agricultural implement.

In another example, the computer-implemented method further comprises performing the agricultural operation with the second agricultural implement on a second region of the field that is not operated on by the first agricultural implement.

In another example, the computer-implemented method further comprises preventing the second agricultural implement from performing the agricultural operation on the first region of the field based on the file having the applied data, prescription data, and field boundary data.

In another example of the computer-implemented method, the first machine comprises a tractor that is towing the first agricultural implement for the agricultural operation.

A further aspect of the disclosure provides a system for transferring one or more files having as applied data and embedded prescription data from one agricultural monitor device of a first machine to another agricultural monitor device of a second machine without using external software to convert the data. The system comprises sensors to collect as applied data for an agricultural operation of a first agricultural implement, memory of a first machine to store files having as applied data and prescription data, and a processor coupled to the sensors and the memory. The processor is configured to store the as applied data into a file of the memory and to embed prescription data and field boundary data into the file.

In one example, the system further comprises a network interface of the first machine to transfer the file having the as applied data, prescription data, and field boundary data to a second machine that is coupled with a second agricultural implement.

In another example of the system, the prescription and boundary data is embedded directly into the file having as applied data with no external software tools.

In another example of the system, the file from the memory of the first machine provides prescriptions, boundaries, and coverage data directly to the second machine and influences control and operation of the agricultural operation that is being performed with the second machine and the second implement.

In another example of the system, the file from the first machine prevents the second agricultural implement from performing the agricultural operation on the first region of the field based on the file having the applied data, prescription data, and field boundary data.

In another example of the system, the prescription data controls various parameters including seed population, down force, fluid application, multi-hybrid planting, and high speed planting on a per region basis of a field.

In another example of the system, the first machine comprises a tractor that is towing the first agricultural implement for the agricultural operation.

In another example of the system, the memory and the processor are located in a cab of the first machine.

A further aspect of the disclosure provides a computer-implemented method for providing telematics and captured images from a machine into one or more unified files. The computer-implemented method comprises obtaining telematics as a first agricultural implement and a first machine traverse a field and perform an agricultural operation on a region of the field. The computer-implemented method captures, with image capturing devices of the first agricultural implement or the first machine, images of crops, plants, or field conditions during the agricultural operation on the region of the field and stores the telematics and captured images into one or more unified files.

In one example of the computer-implemented method, the one or more unified files are stored in an electronic device of the first machine.

In another example, the computer-implemented method further comprises transferring the one or more unified files with the telematics and images to a second electronic device of a second machine or any other remote location.

In one example of the computer-implemented method, the telematics comprises two or more of GPS data, machine location, engine and transmission status, hydraulic operations, and run time tracking of the first machine.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

FIG. 4 illustrates a flow diagram of one embodiment for a method of data transfer between a first machine (e.g., tractor, combine harvester, etc.) and a second machine.

FIG. 5 illustrates a flow diagram of one embodiment for a method of obtaining telematics and images captured by an implement or machine during an agricultural operation (e.g., planting, fluid application, vision scouting of crops, weeds, and field conditions) and combining into a unified file.

DETAILED DESCRIPTION

All references cited herein are incorporated herein in their entireties. If there is a conflict between a definition herein and in an incorporated reference, the definition herein shall control.

Figure 1:
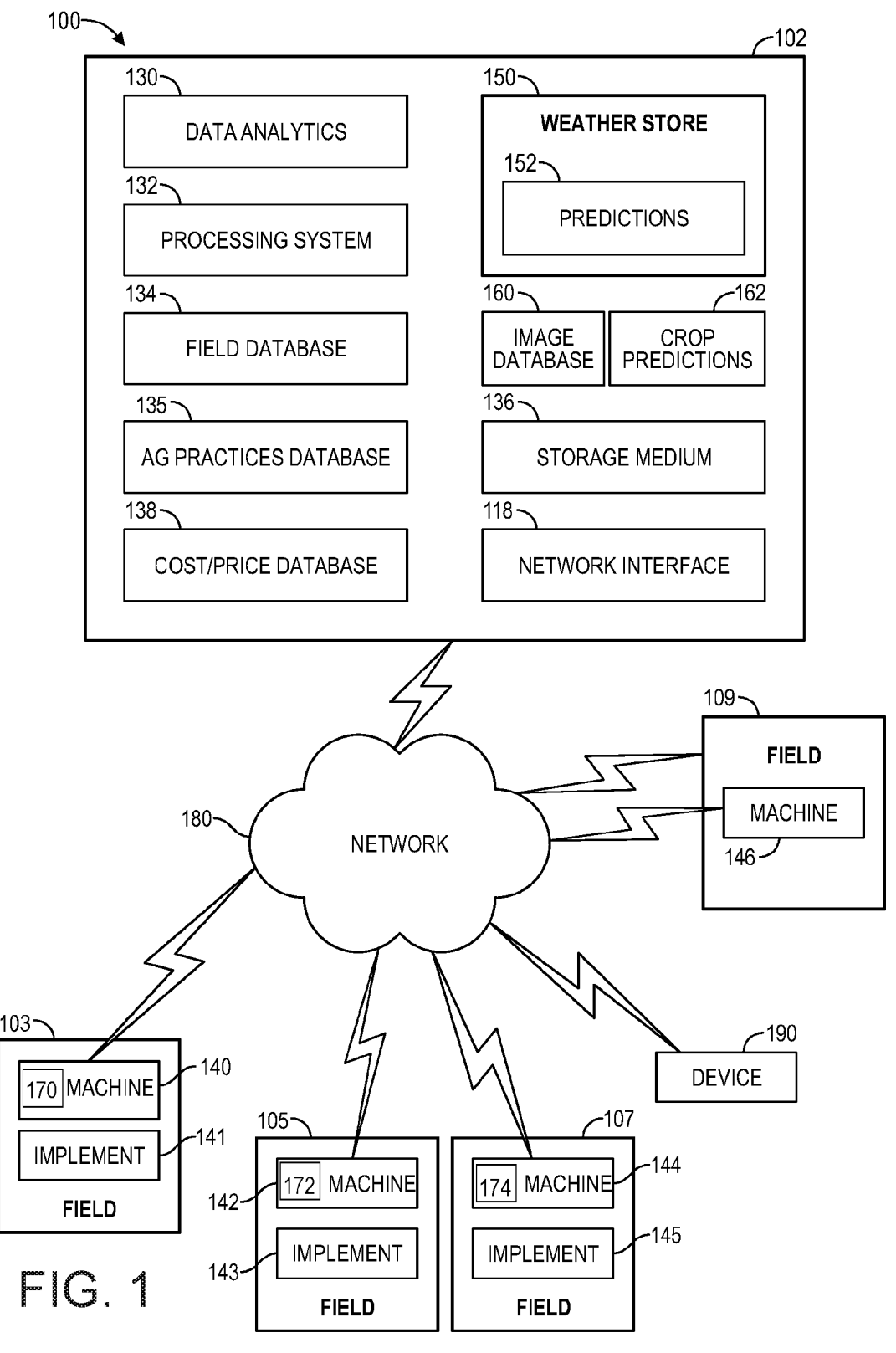
FIG. 1 shows an example of a system for performing agricultural operations of agricultural fields.

Referring to the drawings, wherein like reference numerals designate identical or corresponding parts throughout the several views, FIG. 1 shows an example of a system 100 for performing agricultural operations (e.g., applying fluid applications to plants) of agricultural fields including operations of an implement having application units. For example, the system 100 may be implemented as a cloud based system with servers, data processing devices, computers, etc. Aspects, features, and functionality of the system 100 can be implemented in servers, planters, planter monitors, sprayers, sidedress bars, combines, laptops, tablets, computer terminals, client devices, user devices (e.g., device 190), handheld computers, personal digital assistants, cellular telephones, cameras, smart phones, mobile phones, computing devices, or a combination of any of these or other data processing devices.

The system 100 can include a network computer or an embedded processing device within another device (e.g., display device) or within a machine (e.g., planter, combine), or other types of data processing systems having fewer components or perhaps more components than that shown in FIG. 1. The system 100 (e.g., cloud based system) and agricultural operations can control and monitor fluid applications using an implement or machine. The system 100 includes machines 140, 142, 144, 146 and implements 141, 143, 145 coupled to a respective machine 140, 142, 144, 146. The machines 140, 142, 144 include a respective cab 170, 172, 174 with each cab including an electronic device (e.g., system 220, computing system 340, 370, processing system 2720, monitor device). The implements (or machines) can include flow devices for controlling and monitoring applications (e.g., seeding, spraying, fertilization) of crops and soil within associated fields (e.g., fields 103, 105, 107, 109). The system 100 includes an agricultural analysis system 102 that can include a weather store 150 with current and historical weather data, weather predictions module 152 with weather predictions for different regions, and at least one processing system 132 for executing instructions for controlling and monitoring different operations (e.g., fluid applications). The storage medium 136 may store instructions, software, software programs, etc for execution by the processing system and for performing operations of the agricultural analysis system 102. In one example, storage medium 136 may contain a fluid application prescription (e.g., fluid application prescription that relates georeferenced positions in the field to application rates). The implement 141 (or any of the implements) may include an implement whose pump, flow sensors and/or flow controllers may be specifically the elements that are in communication with the network 180 for sending control signals or receiving as-applied data. The network 180 (e.g., any cellular network (e.g., 4G, 5G), Internet, wide area network, WiMax, satellite, IP network, etc.) allows the system 102, machines, and implements of FIG. 1 to communicate between each other when the system 102, machines (e.g., 140, 142, 144, 146), or implements (e.g., 141, 143, 145) are connected to the network 180. Examples of agricultural monitors are described in PCT Publication Nos. WO2008/086318, WO2012/129442, WO2013/049198, WO2014/026183, and WO2014/018717. An example of an agricultural monitor is the 20120® monitor (or monitor device) from Precision Planting, LLC. In one example, a monitor (or monitor device) preferably includes a graphical user interface ("GUI"), a memory, a central processing unit ("CPU"), and a bus node. The bus node preferably comprises a controller area network ("CAN") node including a CAN transceiver, a controller, and a processor. The monitor is preferably in electrical communication with a speed sensor (e.g., a radar speed sensor mounted to a tractor) and a global positioning receiver ("GPS") receiver mounted to the tractor (or in some embodiments to a toolbar of an implement).

As an agricultural implement traverses a field, a monitor A of a first machine (e.g., 140, 142, 144, 146) collects as applied data at various points in the field. The first machine may be coupled to the agricultural implement and causing the agricultural implement to traverse the field. The as applied data can be seeding information, such as percent singulation, skips, multiples, downforce, applied fluids, depth measurements, agronomic measurements, and anything else that is collected.

As, the as applied data is collected and stored in a monitor data file of the monitor A, field boundary and prescriptions are embedded into the data file.

File transfer from monitor A of the first machine to monitor B of a second machine can be accomplished through any data exchange, such as saving the file to a USB stick, via cloud exchange, or by direct vehicle to vehicle communications network. In one example, the first machine and the second machine are communicatively coupled to the network 180 and one or more files are transferred from the monitor A to the monitor B via the network 180.

Data recorded by monitor A at one location can be used to influence control of monitor B in other locations. For instance, when seeds are dropped, spatial data indicates that seeds have been applied (or covered) in that area. That coverage information can then be used by monitor B as the equipment traverses the field to instruct the control modules when to turn on or off. This information is used to automatically control the equipment. Many data channels exist that are mapped spatially to be viewed by the operator. In many cases, this data is not used by the monitor to automatically control itself while the equipment traverses the field. However, the operator is influenced by this information, and the operator may choose to operate the equipment in a different way based on data from previous field passes and his present location in the field. Sharing data between equipment can either influence the automatic control of the equipment, or it influences the operator, who then controls the equipment differently. This disclosure reduces the complexity of the data sharing process.

Figure 2:
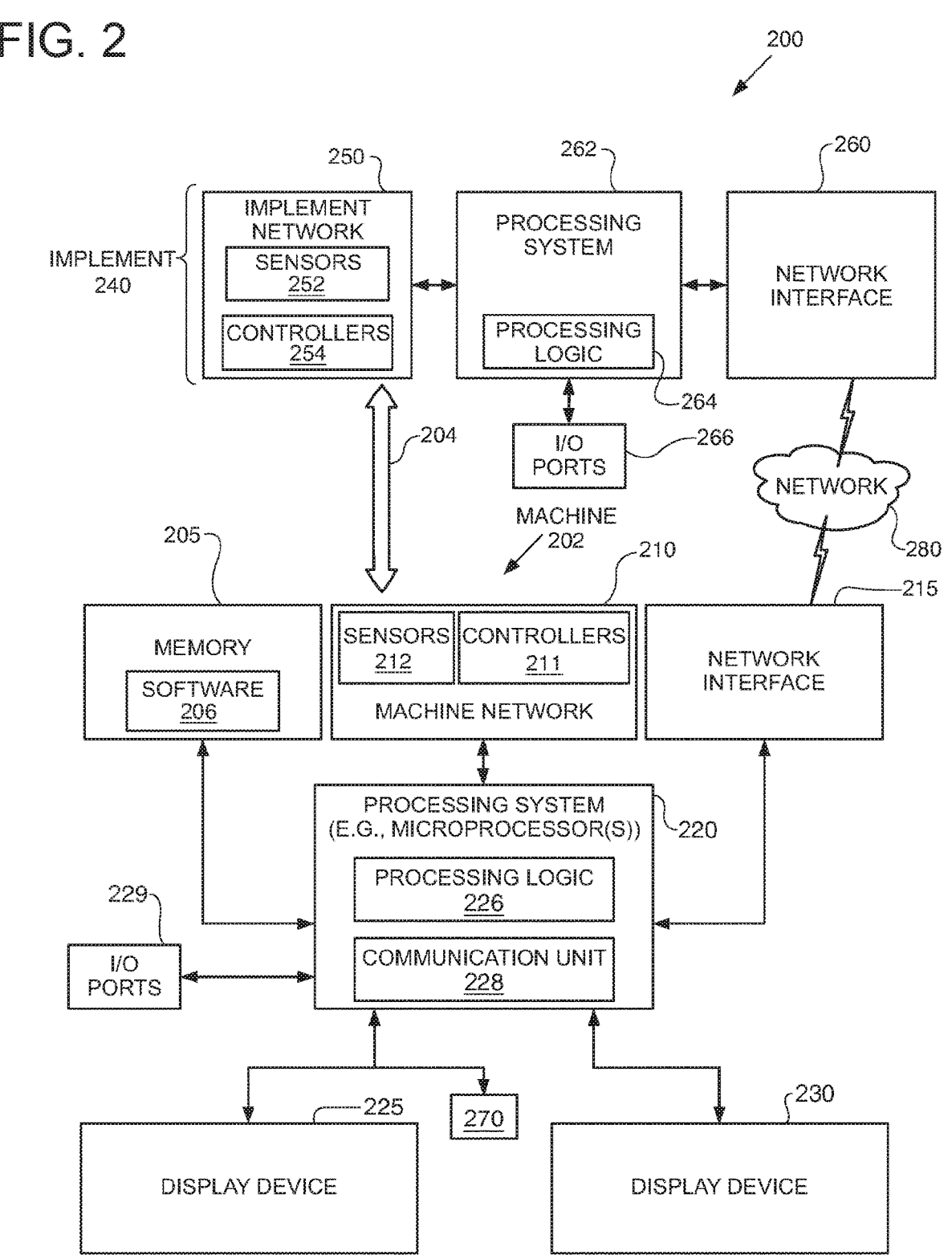
FIG. 2 shows an example of a system 200 that includes a machine 202 (e.g., tractor, combine harvester, etc.), a network 280, and an implement 240 (e.g., planter, cultivator, plough, sprayer, spreader, irrigation implement, etc.) in accordance with one embodiment.

FIG. 2 shows an example of a system 200 that includes a machine 202 (e.g., tractor, combine harvester, etc.), a network 280, and an implement 240 (e.g., planter, cultivator, plough, sprayer, spreader, irrigation implement, etc.) in accordance with one embodiment. The system 200 (e.g., cloud based system) can be utilized for performing agricultural data analysis and agricultural operations. The machine 202 includes a processing system 220, memory 205, machine network 210 (e.g., a controller area network (CAN) serial bus protocol network, an IS OBUS network, etc.), and a network interface 215 for communicating with other systems or devices including the implement 240 and the network 280 (e.g., cellular network, Internet, wide area network, WiMax, satellite, IP network, etc.). The network interfaces 215 and 260 include one or more types of transceivers for communicating via the network 280. In one example, the network interface 215 includes a cellular modem and RF circuitry with an antenna for bi-directional communications with a cellular network 280. The machine network 210 includes sensors 212 (e.g., speed sensors) and controllers 211 (e.g., GPS receiver, radar unit) for controlling and monitoring operations of the machine. The network interface 215 can include at least one of a cellular transceiver, GPS transceiver, a WLAN transceiver (e.g., WiFi), an infrared transceiver, a Bluetooth transceiver, Ethernet, or other interfaces from communications with other devices and systems including the implement 240 or another machine (e.g., 140, 142, 144, 146). The network interface 215 may be integrated with the machine network 210 or separate from the machine network 210 as illustrated in FIG. 2. The I/O ports 229 (e.g., diagnostic/on board diagnostic (OBD) port) enable communication with another data processing system or device (e.g., display devices, sensors, etc.).

The processing system 220 may include one or more microprocessors, processors, a system on a chip (integrated circuit), or one or more microcontrollers. The processing system includes processing logic 226 for executing software instructions of one or more programs and a communication unit 228 (e.g., transmitter, transceiver) for transmitting and receiving communications from the machine via machine network 210 or network interface 215 or implement via implement network 250 or network interface 260. The communication unit 228 may be integrated with the processing system or separate from the processing system. In one embodiment, the communication unit 228 is in data communication with the machine network 210 and implement network 250 via a diagnostic/OBD port of the I/O ports 229. Processing logic 226 including one or more processors may process the communications received from the communication unit 228 including agricultural data. The system 200 includes memory 205 for storing data and programs for execution (software 206) by the processing system. The memory 205 can store, for example, software components such as an agricultural implement software application for monitoring and controlling field operations, a field and task identification software application or module for identifying one or more fields, or any other software application or module. The memory 205 can be any known form of a machine readable non-transitory storage medium, such as semiconductor memory (e.g., flash; SRAM; DRAM; etc.) or non-volatile memory, such as hard disks or solid-state drive. The system can also include an audio input/output subsystem (not shown) which may include a microphone and a speaker for, for example, receiving and sending voice commands or for user authentication or authorization (e.g., biometrics). Display devices 225 and 230 can provide visual user interfaces for a user or operator. The display devices may include display controllers. In one embodiment, the display device 225 is a portable tablet device or computing device with a touchscreen that displays images (e.g., high definition field maps of as-planted or as-harvested data, images for identification of fields and tasks) and data generated by the field and task identification software application or agricultural implement software application and receives input from the user or operator for identifying fields and tasks, correcting identified fields and tasks, or monitoring and controlling field operations. The operations may include configuration of the machine or implement, reporting of data, control of the machine or implement including sensors and controllers, and storage of the data generated. The display device 230 may be a display (e.g., display provided by an original equipment manufacturer (OEM)) that displays images and data for identifying fields and tasks, correcting identified fields and tasks, controlling a machine (e.g., planter, tractor, combine, sprayer, etc.), steering the machine, and monitoring the machine or an implement (e.g., planter, combine, sprayer, etc.) that is connected to the machine with sensors and controllers located on the machine or implement.

A monitor (e.g., monitor A, monitor B) may include the processing system 220, a display device (e.g., 225, 230), memory 205, at least a portion of the machine network 210, and optionally the network interface 215.

A cab control module 270 may include an additional control module for enabling or disabling certain components or devices of the machine or implement. For example, if the user or operator is not able to control the machine or implement using one or more of the display devices, then the cab control module may include switches to shut down or turn off components or devices of the machine or implement.

The implement 240 (e.g., planter, cultivator, plough, sprayer, spreader, irrigation implement, etc.) includes an implement network 250, a processing system 262 having processing logic 264, a network interface 260, and optional input/output ports 266 for communicating with other systems or devices including the machine 202. The implement network 250 (e.g., a controller area network (CAN) serial bus protocol network, an ISOBUS network, etc.) includes sensors 252 (e.g., speed sensors, seed sensors for detecting passage of seed, downforce sensors, actuator valves, etc.), controllers 254 (e.g., GPS receiver), and the processing system 262 for controlling and monitoring operations of the machine. The sensors may include moisture sensors or flow sensors for a combine, speed sensors for the machine, downforce (e.g., row unit downforce) sensors for a planter, liquid application sensors for a sprayer, or vacuum, lift, or lower sensors for an implement. For example, the sensors may comprise processors in communication with a plurality of seed sensors. The processors are preferably configured to process seed sensor data and transmit processed data to the processing system 262 or 220. The controllers and sensors may be used for monitoring motors and drives on a planter including a variable rate drive system for changing plant populations. The controllers and sensors may also provide swath control to shut off individual rows or sections of the planter. The sensors and controllers may sense changes in an electric motor that controls each row of a planter individually. These sensors and controllers may sense seed delivery speeds in a seed tube for each row of a planter.

The network interface 260 can be a cellular transceiver, a WLAN transceiver (e.g., WiFi), an infrared transceiver, a Bluetooth transceiver, Ethernet, or other interfaces for communication with other devices and systems including the machine 202. The network interface 260 may be integrated with the implement network 250 or separate from the implement network 250 as illustrated in FIG. 2.

The implement communicates with the machine via wired and/or wireless bi-directional communications 204. The implement network 250 may communicate directly with the machine network 250 or via the network interfaces 215 and 260. The implement may also be physically coupled to the machine for agricultural operations (e.g., planting, harvesting, spraying, etc.).

The memory 205 may be a machine-accessible non-transitory medium on which is stored one or more sets of instructions (e.g., software 206) embodying any one or more of the methodologies or functions described herein. The software 206 may also reside, completely or at least partially, within the memory 205 and/or within the processing system 220 during execution thereof by the system 200, the memory and the processing system also constituting machine-accessible storage media. The software 206 may further be transmitted or received over a network via the network interface 215.

Embodiments of the present disclosure may be provided as a computer program product, which may include a machine-readable storage medium embodying thereon instructions, which may be used to program a computer (or other electronic devices) to perform a process. The machine-readable medium (or computer-readable medium) may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

While the machine-readable non-transitory medium (e.g., memory 205) is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" or "machine-readable non-transitory medium" shall also be taken to include any medium that is capable of storing a set of instructions for execution by the machine and that cause the machine to perform any one or more of the methodologies of the present invention. The term "machine-accessible non-transitory medium" shall accordingly be taken to include, but not be limited to, solid-state memories, optical and magnetic media.

Figure 3:
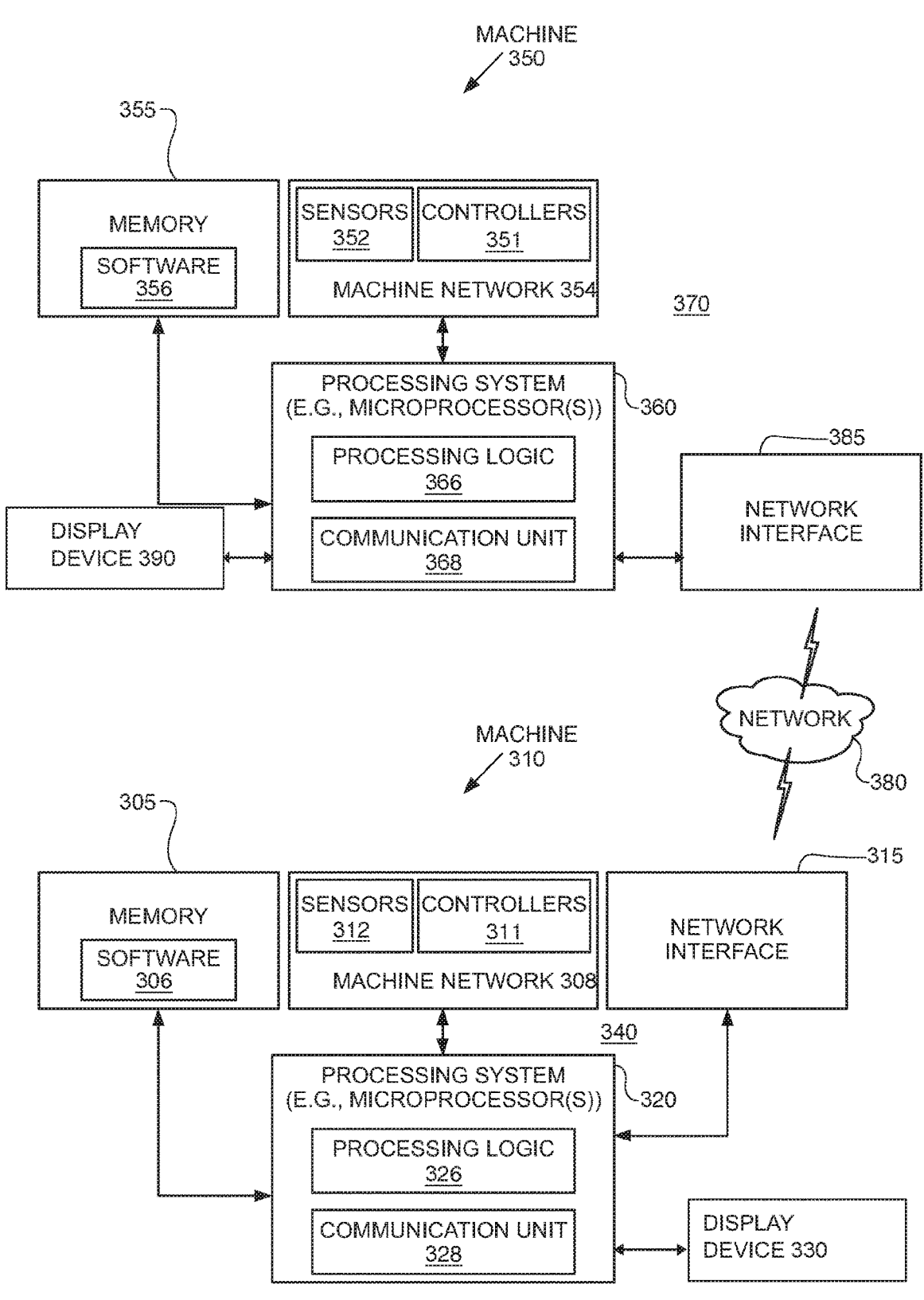
FIG. 3 shows an example of a data transfer between a machine 350 (e.g., tractor, combine harvester, etc.) and a machine 310 in accordance with one embodiment.

FIG. 3 shows an example of a data transfer between a machine 350 (e.g., tractor, combine harvester, etc.) and a machine 310 in accordance with one embodiment. A first machine (e.g., 310, 350) can collect as applied data during an application pass, store the applied data into one or more files, and then embed prescription data and field boundary data into the one or more files. The one or more files with the embedded prescription data and field boundary data may be stored in any memory device of the first machine and then transferred to a second machine (e.g., 350, 310) via the network 380 or any type of local machine to machine network.

The machine 350 includes a computing system 370 that includes a processing system 360, memory 355 with software 356, machine network 354 (e.g., a controller area network (CAN) serial bus protocol network, an ISOBUS network, etc.), and a network interface 385 for communicating with other systems or devices including the machine 310 and the network 380 (e.g., cellular network, Internet, wide area network, WiMax, satellite, IP network, etc.) for data transfer. The network interfaces 315 and 385 include one or more types of transceivers for communicating via the network 380. In one example, the network interface 385 includes a cellular modem and RF circuitry with an antenna for bi-directional communications with a cellular network. The machine network 354 includes sensors 352 (e.g., speed sensors) and controllers 351 (e.g., GPS receiver, radar unit) for controlling and monitoring operations of the machine. The network interface 385 can include at least one of a cellular transceiver, GPS transceiver, a WLAN transceiver (e.g., WiFi), an infrared transceiver, a Bluetooth transceiver, Ethernet, or other interfaces from communications with other devices and systems including an implement or another machine (e.g., 140, 142, 144, 146, 310). The network interface 385 may be integrated with the machine network 354 or separate from the machine network 354 as illustrated in FIG. 3.

The processing system 360 may include one or more microprocessors, processors, a system on a chip (integrated circuit), or one or more microcontrollers. The processing system includes processing logic 366 for executing software instructions of one or more programs and a communication unit 368 (e.g., transmitter, transceiver) for transmitting and receiving communications for the machine via machine network 354 or network interface 385.

The memory 355 stores data and programs for execution (software 356) by the processing system. The memory 355 can store, for example, software components such as an agricultural software application for monitoring and controlling field operations, a software application or module for embedding prescription data and field boundary data directly into as applied data files, or any other software application or module.

One or more display devices 390 can provide visual user interfaces for a user or operator. The display devices may include display controllers. In one embodiment, the display device 390 is a portable tablet device or computing device with a touchscreen that displays images (e.g., high definition field maps of as-planted or as-harvested data, images for identification of fields and tasks) and data generated by the field and task identification software application or agricultural implement software application and receives input from the user or operator for monitoring and controlling field operations. The operations may include configuration of the machine or implement, reporting of data, control of the machine or implement including sensors and controllers, and storage of the data generated. The display device 390 may be a display (e.g., display provided by an original equipment manufacturer (OEM)) that displays images and data for controlling a machine (e.g., planter, tractor, combine, sprayer, etc.), steering the machine, and monitoring the machine or an implement (e.g., planter, combine, sprayer, etc.) that is connected to the machine with sensors and controllers located on the machine or implement.

The machine 310 includes similar components as described for the machine 350. The machine 310 includes a computing system 340 that includes a memory 305 with software 306, a processing system 320 with processing logic 326 and communication unit 328, a machine network 308 having sensors 312 and controllers 311. The computing system 340 may also include a network interface 315 and one or more display devices 330.

A monitor device may include similar components as computing system 340 or 370 including a processing system (e.g., 320, 360), a display device (e.g., 330, 390), memory (e.g., 305, 355), at least a portion of the machine network (e.g., 308, 354), and optionally the network interface (e.g., 315, 385).

FIG. 4 illustrates a flow diagram of one embodiment for a computer-implemented method of data transfer between a first machine (e.g., tractor, combine harvester, etc.) and a second machine. The method is performed by processing logic that may comprise hardware (circuitry, dedicated logic, etc.), software (such as is run on a general purpose computer system or a dedicated machine or a device), or a combination of both. In one embodiment, the computer-implemented method is performed by processing logic of a device (e.g., system 200, computing system 340, 370, machine, apparatus, monitor, display device, user device, self-guided device, self-propelled device, etc.). The device executes instructions of a software application or program with processing logic. The software application or program can be initiated by the device. In one example, a monitor or display device receives user input and provides a customized display for operations of the method.

At operation 402, a software application (e.g., agricultural software application) is initiated on an first electronic device (e.g., system 2720, system 220, computing system 340, 370, monitor device, apparatus, user device, self-guided device, self-propelled device, etc.) and displayed as a user interface. The electronic device may be integrated with or coupled to a first machine that is moving a first agricultural implement across a field during an application pass. In one example, the software application is initiated on a first monitor device of a first machine that is towing a first implement across a field.

At operation 404, the computer-implemented method includes collecting as applied data (e.g., seeding information, such as percent singulation, skips, multiples, downforce, applied fluids, depth measurements, agronomic measurements, etc.) as a first agricultural implement traverses a field and performs an agricultural operation or application (e.g., planting, fluid application, etc.) on a first region of the field. At operation 406, the computer-implemented method includes storing the as applied data into one or more files and embedding prescription data and field boundary data into the one or more files. In one embodiment, data can be stored as is done for binary large objects (BLOB). The data can be stored anywhere, but in one embodiment, the data can be stored in the file that is used for coverage data. Images can be embedded into the file as any bitmap binary format, (e.g., .bmp, .png, or others). The one or more files may be stored locally in the first electronic device (e.g., system 220, computing system 340, 370, the first monitor device, or any memory device) of the first machine. In one example, the prescription data and field boundary data is embedded directly into the one or more files without a complicated data conversion using third party software tools. The prescription data can control various parameters including seed population, down force, fluid application, multi-hybrid planting, and high speed planting on a per region basis of a field.

For a conventional approach, the complicating data conversion involves extracting the as applied data from the first monitor, transferring the as applied data to a remote location having third party software tools, moving the data through a series of external third party software tools to convert the as applied data into prescriptions and boundaries of new and separate files. Then, the new files are transferred to a second monitor that executes the agricultural software application during the application pass for a second machine.

At operation 408, the computer-implemented method further includes transferring the one or more files with the embedded prescription data and field boundary data to a second electronic device (e.g., system 2720, system 220, computing system 340, 370, second monitor device) of a second machine that is coupled to a second agricultural implement for an agricultural operation or application. The first machine and the second machine can be communicatively coupled to each other via a network (e.g., network 180, 280, 380, a local machine-to-machine network, etc.).

At operation 410, the computer-implemented method includes performing the agricultural operation or application (e.g., the same agricultural operation or application of the first implement) with the second agricultural implement on a second region of the field that is not operated on by the first agricultural implement for the agricultural operation or application. At operation 412, the computer-implemented method includes preventing the second agricultural implement from performing the agricultural operation on the first region of the field based on the file having the applied data, prescription data, and field boundary data that indicates that the agricultural operation has already been performed on the first region of the field.

This data transfer from the first machine to the second machine is made possible because prescription and boundary data is embedded directly into the as applied data files with no external software tools. As a result, the as applied data files from the first electronic device (e.g., system 220, computing system 340, 370, monitor device) will be able to provide prescriptions, boundaries, and coverage data directly to the second electronic device (e.g., system 220, computing system 340, 370, monitor device) and thus influence control and operation of the application pass that is being performed with the second machine and the second implement. Data from the second electronic device (e.g., system 220, computing system 340, 370, monitor device) will be viewable alongside the first electronic device's (e.g., system 220, computing system 340, 370, monitor device) data (e.g., maps, summaries, etc.). This data transfer feature permits direct control and sharing, eliminates the complexity of data conversion with third party software tools, and permits agricultural control and operations to be performed and viewed with a display device (e.g., in-cab displays) of the electronic device (e.g., system 220, computing system 340, 370, monitor device). The transferred files can provide various types of agricultural data including guidance lines and controlling force-type prescriptions (e.g., down force, row cleaner, closing, etc.). FIG. 5 illustrates a flow diagram of one embodiment for a computer-implemented method of obtaining telematics and images captured by an implement or machine during an agricultural operation (e.g., planting, fluid application, vision scouting of crops, weeds, and field conditions) and combining into a unified file. The computer-implemented method is performed by processing logic that may comprise hardware (circuitry, dedicated logic, etc.), software (such as is run on a general purpose computer system or a dedicated machine or a device), or a combination of both. In one embodiment, the method is performed by processing logic of a device (e.g., system 700, system 200, computing system 340, 370, machine, apparatus, monitor, display device, user device, self-guided device, self-propelled device, etc.). The device executes instructions of a software application or program with processing logic. The software application or program can be initiated by the device. In one example, a monitor or display device receives user input and provides a customized display for operations of the method.

At operation 502, a software application (e.g., agricultural software application) is initiated on a first electronic device (e.g., system 2720, system 220, computing system 340, 370, monitor device, apparatus, user device, self-guided device, self-propelled device, etc.) and displayed on a monitor or a display device as a user interface. The first electronic device may be integrated with or coupled to a first machine that is moving a first agricultural implement across a field during an application pass. Alternatively, the first electronic device may be integrated with an apparatus (e.g., drone, image capture device) associated with the first machine that captures images before, during, or after the application pass. In one example, the software application is initiated on the first device of a first machine that is towing a first implement across a field.

At operation 504, the computer-implemented method includes obtaining telematics (e.g., GPS data, machine location, engine and transmission status, hydraulic operations, combine operation information, operating parameters, run time tracking, and other data), as applied data (e.g., seeding information, such as percent singulation, skips, multiples, downforce, applied fluids, depth measurements, agronomic measurements, etc.), and images of crops, plants, and field conditions as a first agricultural implement traverses a field and performs an agricultural operation or application (e.g., planting, fluid application, vision scouting, etc.) on a region of the field.

At operation 506, the computer-implemented method includes storing the telematics and captured images into one or more unified files as described above. Optionally, the as applied data can also be included in the one or more unified files. The one or more unified files may be stored locally in the first electronic device (e.g., memory 705 of machine 702, system 220, computing system 340, 370, the first monitor device, or any memory device) of the first machine. In one example, the telematics and capture images are added directly into the one or more files without a complicated data conversion using third party software tools. The images may capture data collected from vision scouting. As a first machine traverses a field and collects telematics and as applied data, images are also captured of the locations where the data is collected.

At operation 508, the computer-implemented method further includes transferring the one or more unified files with the telematics and images to a second electronic device (e.g., system 200, computing system 340, 370, second monitor device) of a second machine or any other remote location (e.g., system 100). The second machine can be coupled to a second agricultural implement for an agricultural operation or application. The first machine and the second machine can be communicatively coupled to each other via a network (e.g., network 180, 280, 380, a local machine-to-machine network, etc.).

Figure 6:
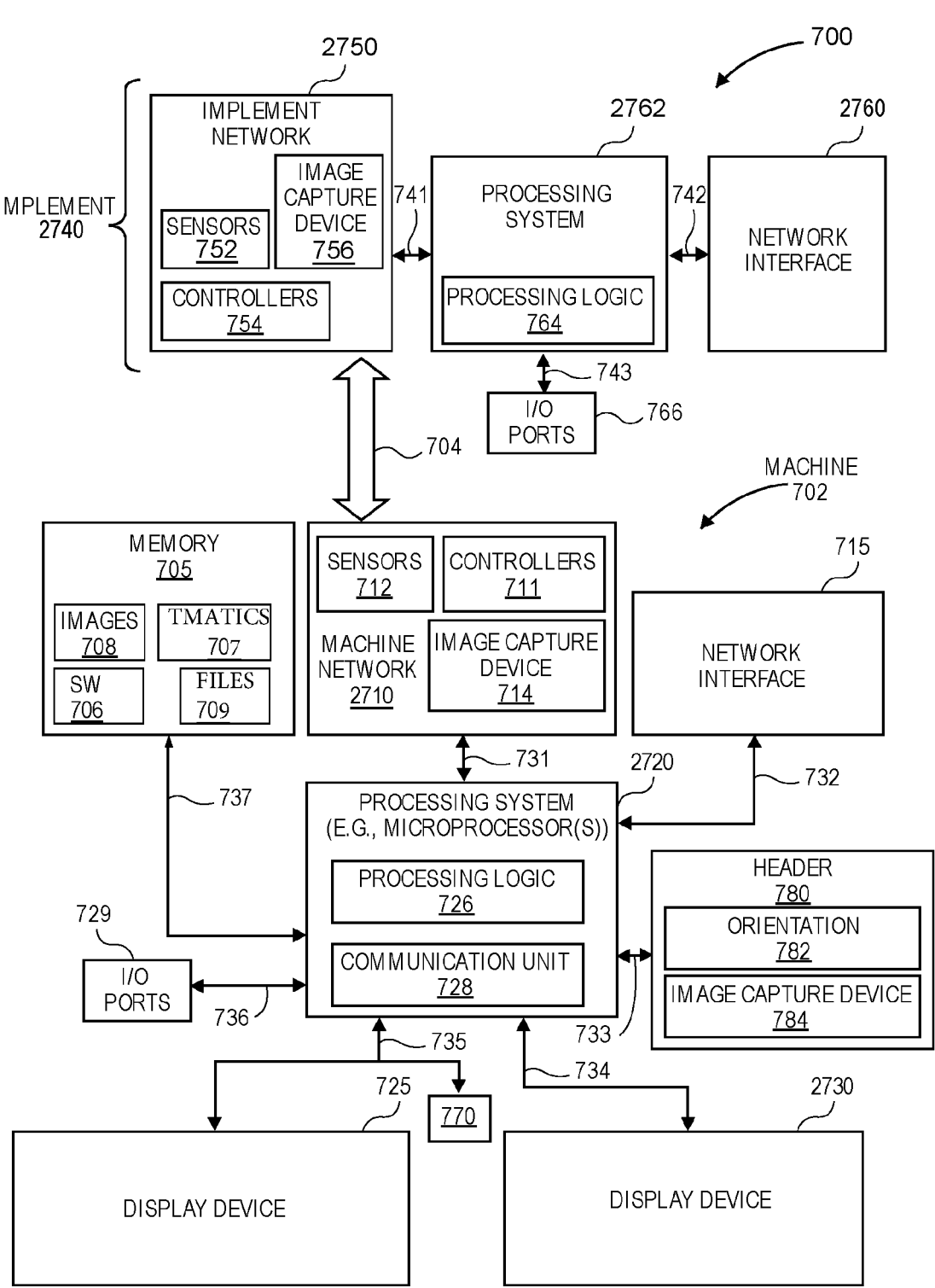
FIG. 6 shows an example of a system 700 that includes a machine 702 (e.g., tractor, combine harvester, etc.) and an implement 2740 (e.g., planter, cultivator, plough, sprayer, spreader, irrigation implement, etc.) in accordance with one embodiment.

FIG. 6 shows an example of a system 700 that includes a machine 702 (e.g., tractor, combine harvester, etc.) and an implement 2740 (e.g., planter, cultivator, plough, sprayer, spreader, irrigation implement, etc.) in accordance with one embodiment. The machine 702 includes a processing system 2720, memory 705, machine network 2710 (e.g., a controller area network (CAN) serial bus protocol network, an ISO-BUS network, etc.), and a network interface 715 for communicating with other systems or devices including the implement 2740. The machine network 2710 includes sensors 712 (e.g., speed sensors), controllers 711 (e.g., GPS receiver, radar unit) for obtaining telematics and controlling and monitoring operations of the machine, and an optional image capture device 714 for capturing images of crops and soil conditions of a field in accordance with embodiments of the present disclosure. The network interface 715 can include at least one of a GPS transceiver, a WLAN transceiver (e.g., WiFi), an infrared transceiver, a Bluetooth transceiver, Ethernet, or other interfaces from communications with other devices and systems including the implement 2740. The network interface 715 may be integrated with the machine network 2710 or separate from the machine network 2710 as illustrated in FIG. 6. The I/O ports 729 (e.g., diagnostic/on board diagnostic (OBD) port) enable communication with another data processing system or device (e.g., display devices, sensors, etc.).

In one example, the machine performs operations of a combine (combine harvester) for harvesting grain crops. The machine combines reaping, threshing, and winnowing operations in a single harvesting operation. An optional header 780 (e.g., grain platform, flex platform) includes a cutting mechanism to cause cutting of crops to be positioned into an auger. The header 780 includes an orientation device 782 or mechanism for orienting a crop (e.g., corn, soybeans) for improving image capture with an image capture device 784.

The processing system 2720 may include one or more microprocessors, processors, a system on a chip (integrated circuit), or one or more microcontrollers. The processing system includes processing logic 726 for executing software instructions of one or more programs and a communication unit 728 (e.g., transmitter, transceiver) for transmitting and receiving communications from the machine via machine network 2710 or network interface 715 or implement via implement network 2750 or network interface 2760. The communication unit 728 may be integrated with the processing system or separate from the processing system. In one embodiment, the communication unit 728 is in data communication with the machine network 2710 and implement network 2750 via a diagnostic/OBD port of the I/O ports 729.

Processing logic 726 including one or more processors may process the communications received from the communication unit 728 including agricultural data. The system 700 includes memory 705 for storing data and programs for execution (software 706) by the processing system. The memory 705 can store, for example, software components such as image capture software, software for performing operations or methods of the present disclosure, or any other software application or module, images (e.g., captured images of crops), alerts, maps, etc. The memory 705 stores images 708 captured from image capturing devices and telematics 707 (e.g., GPS data, machine location, engine and transmission status, hydraulic operations, combine operation information, operating parameters, run time tracking, and other data). The images 708 and telematics 707 can be provided or combined into one or more unified files 709. The memory 705 can be any known form of a machine readable non-transitory storage medium, such as semiconductor memory (e.g., flash; SRAM; DRAM; etc.) or non-volatile memory, such as hard disks or solid-state drive. The system can also include an audio input/output subsystem (not shown) which may include a microphone and a speaker for, for example, receiving and sending voice commands or for user authentication or authorization (e.g., biometrics).

The processing system 2720 communicates bi-directionally with memory 705, machine network 2710, network interface 715, header 780, display device 2730, display device 725, and I/O ports 729 via communication links 731-737, respectively.

Display devices 725 and 2730 can provide visual user interfaces for a user or operator. The display devices may include display controllers. In one embodiment, the display device 725 (or computing device 725) is a portable tablet device or computing device with a touchscreen that displays images (e.g., captured images, localized view map layer, high definition field maps of as-planted or as-harvested data or other agricultural variables or parameters, yield maps, alerts, etc.) and data generated by an agricultural data analysis software application or field view software application and receives input from the user or operator for a customized scale region and corresponding view of a region of a field, monitoring and controlling field operations, or any operations or methods of the present disclosure. The processing system 2720 and memory 705 can be integrated with the computing device 725 or separate from the computing device. The operations may include configuration of the machine or implement, reporting of data, control of the machine or implement including sensors and controllers, and storage of the data generated. The display device 2730 may be a display (e.g., display provided by an original equipment manufacturer (OEM)) that displays images and data for a localized view map layer, as-planted or as-harvested data, yield data, controlling a machine (e.g., planter, tractor, combine, sprayer, etc.), steering the machine, and monitoring the machine or an implement (e.g., planter, combine, sprayer, etc.) that is connected to the machine with sensors and controllers located on the machine or implement.

A cab control module 770 may include an additional control module for enabling or disabling certain components or devices of the machine or implement. For example, if the user or operator is not able to control the machine or implement using one or more of the display devices, then the cab control module may include switches to shut down or turn off components or devices of the machine or implement.

The implement 2740 (e.g., planter, cultivator, plough, sprayer, spreader, irrigation implement, etc.) includes an implement network 2750, a processing system 2762, a network interface 2760, and optional input/output ports 766 for communicating with other systems or devices including the machine 702. The implement network 2750 (e.g., a controller area network (CAN) serial bus protocol network, an ISOBUS network, etc.) includes an image capture device 756 for capturing images of crop development and soil conditions, sensors 752 (e.g., speed sensors, seed sensors for detecting passage of seed, downforce sensors, actuator valves, OEM sensors, etc.), controllers 754 (e.g., GPS receiver), and the processing system 2762 for controlling and monitoring operations of the machine. The OEM sensors may be moisture sensors or flow sensors for a combine, speed sensors for the machine, seed force sensors for a planter, liquid application sensors for a sprayer, or vacuum, lift, lower sensors for an implement. For example, the controllers may include processors in communication with a plurality of seed sensors. The processors are configured to process images captured by image capture device 756 or seed sensor data and transmit processed data to the processing system 2762 or 2720. The controllers and sensors may be used for monitoring motors and drives on a planter including a variable rate drive system for changing plant populations. The controllers and sensors may also provide swath control to shut off individual rows or sections of the planter. The sensors and controllers may sense changes in an electric motor that controls each row of a planter individually. These sensors and controllers may sense seed delivery speeds in a seed tube for each row of a planter.

The network interface 2760 can be a GPS transceiver, a WLAN transceiver (e.g., WiFi), an infrared transceiver, a Bluetooth transceiver, Ethernet, or other interfaces from communications with other devices and systems including the machine 702. The network interface 2760 may be integrated with the implement network 2750 or separate from the implement network 2750 as illustrated in FIG. 6.

The processing system 2762 communicates bi-directionally with the implement network 2750, network interface 2760, and I/O ports 766 via communication links 741-743, respectively.

The implement communicates with the machine via wired and possibly also wireless bi-directional communications 704. The implement network 2750 may communicate directly with the machine network 2710 or via the network interfaces 715 and 2760. The implement may also by physically coupled to the machine for agricultural operations (e.g., planting, harvesting, spraying, vision scouting, etc.).

The memory 705 may be a machine-accessible non-transitory medium on which is stored one or more sets of instructions (e.g., software 706) embodying any one or more of the methodologies or functions described herein. The software 706 may also reside, completely or at least partially, within the memory 705 and/or within the processing system 2720 during execution thereof by the system 700, the memory and the processing system also constituting machine-accessible storage media. The software 706 may further be transmitted or received over a network via the network interface device 715.

EXAMPLES

The following are nonlimiting examples.

Example 1—A method comprising: collecting as applied data as a first agricultural implement traverses a field and performs an operation on the field; storing the as applied data into a file in a first monitor; and embedding prescription data and field boundary data into the file.

Example 2—The method of claim 1 further comprising transferring the file to a second monitor.

Example 3—The method of claim 2 further comprising performing the operation with a second agricultural implement on a portion the field not operated on by the first agricultural implement.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing FIG.s but is to be accorded the widest scope consistent with the spirit and scope of the appended claims.

The invention claimed is:

1. A computer-implemented method comprising:
   collecting, with one or more sensors, as applied data as a first machine that is coupled with a first agricultural implement both traverse a field and perform an agricultural operation on a first region of the field;
   storing the as applied data into a file of a first device that is in-cab of the first machine; and
   embedding, with a processing system of the first device, prescription data and field boundary data into the file of the first device that is in-cab of the first machine during the agricultural operation concurrently with the as applied data being collected and stored in the file of the first device.

2. The computer-implemented method of claim 1 further comprising:
   transferring the file having the applied data, prescription data, and field boundary data from the first device that is in-cab of the first machine to a second device of a second machine that is coupled with a second agricultural implement.

3. The computer-implemented method of claim 2, wherein the prescription and boundary data is embedded directly into the file having as applied data with no external software tools.

4. The computer-implemented method of claim 1, wherein the file from the first device provides prescriptions, boundaries, and coverage data directly to a second device of the second machine and thus influences an agricultural operation including coverage of an application pass that is being performed with the second machine and the second implement.

5. The computer-implemented method of claim 4, wherein the second device displays as-applied data of the second agricultural implement in-cab of the second machine alongside the as-applied data of the first agricultural implement.

6. The computer-implemented method of claim 2 further comprising:
   performing the agricultural operation with the second agricultural implement on a second region of the field that is not operated on by the first agricultural implement.

7. The computer-implemented method of claim 6 further comprising:
   preventing the second agricultural implement from performing the agricultural operation on the first region of the field based on the file having the applied data, prescription data, and field boundary data.

8. The computer-implemented method of claim 1, wherein the first machine comprises a tractor that is towing the first agricultural implement for the agricultural operation.

9. A system comprising:
   sensors to collect as applied data for an agricultural operation of a first agricultural implement;
   memory that is in-cab of a first machine to store files having as applied data and prescription data; and
   one or more processors coupled to the sensors and the memory, the one or more processors is configured to store the as applied data into a file of the memory and to embed prescription data and field boundary data into the file of the memory that is in-cab of the first machine concurrently with the as applied data being collected and stored in the file.

10. The system of claim 9 further comprising:
   a network interface of the first machine to transfer the file having the as applied data, prescription data, and field boundary data to a second machine that is coupled with a second agricultural implement.

11. The system of claim 10, wherein the prescription and boundary data is embedded directly into the file having as applied data with no external software tools.

12. The system of claim 9, wherein the file from the memory of the first machine provides prescriptions, boundaries, and coverage data directly to the second machine and influences an agricultural operation including coverage of an application pass that is being performed with the second machine and the second implement.

13. The system of claim 12, wherein the file from the first machine prevents the second agricultural implement from performing the agricultural operation on the first region of the field based on the file having the applied data, prescription data, and field boundary data.

14. The system of claim 9, wherein the prescription data controls various parameters including seed population, down force, fluid application, multi-hybrid planting, and high speed planting on a per region basis of a field.

15. The system of claim 9, wherein the first machine comprises a tractor that is towing the first agricultural implement for the agricultural operation.

16. The system of claim 9, wherein the memory and the one or more processors are located in the cab of the first machine.

\*    \*    \*    \*    \*